(12) United States Patent
White

(10) Patent No.: US 7,546,727 B2
(45) Date of Patent: Jun. 16, 2009

(54) REDUCED NOISE JET ENGINE

(75) Inventor: Edward V White, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/988,286

(22) Filed: Nov. 12, 2004

(65) Prior Publication Data

US 2006/0101803 A1 May 18, 2006

(51) Int. Cl.
*F02K 1/10* (2006.01)
(52) U.S. Cl. .................. 60/204; 60/226.1; 60/264; 60/771; 239/265.19
(58) Field of Classification Search .......... 60/262, 60/264, 232, 204, 771; 239/265.17, 265.19
See application file for complete search history.

(56) References Cited

U.S. PATENT DOCUMENTS

| | | | |
|---|---|---|---|
| 3,836,099 A | 9/1974 | O'Neill et al. | |
| 5,150,864 A | 9/1992 | Roglin et al. | |
| 5,261,227 A | 11/1993 | Giffin, III | |
| 5,662,294 A * | 9/1997 | Maclean et al. | 244/219 |
| 5,804,276 A | 9/1998 | Jacobs et al. | |
| 6,009,669 A | 1/2000 | Jardine et al. | |
| 6,108,978 A | 8/2000 | Jeong | |
| 6,260,567 B1 * | 7/2001 | Gruensfelder et al. | 137/1 |
| 6,318,070 B1 | 11/2001 | Rey et al. | |
| 6,499,952 B1 | 12/2002 | Jacot et al. | |

(Continued)

FOREIGN PATENT DOCUMENTS

EP 1 130 243 3/2001

(Continued)

OTHER PUBLICATIONS

Mabe et al "Morphing Chevrons for Take Off and Cruise Noise Reduction," Active 2004—The 2004 International Symposium on Active Control of Sound and Vibration Institute of Noise Control Engineering Williamsburg, Virginia Active 2004, Sep. 20-22, 2004, pp. 1-12.*

(Continued)

*Primary Examiner*—Ted Kim
(74) *Attorney, Agent, or Firm*—Harness, Dickey & Pierce, P.L.C.

(57) ABSTRACT

A system for controlling a position of jet engine exhaust mixing tabs includes a plurality of exhaust mixing tabs spaced apart from one another and extending from a lip of an exhaust nozzle of a jet engine nacelle adjacent a flow path of an exhaust flow emitted from the exhaust nozzle. Each of the exhaust mixing tabs are constructed to be controllably deformable from a first position adjacent the flow path to a second position extending into the flow path of the exhaust flow in response to a control signal applied to each of the exhaust mixing tabs. In the first position, the exhaust mixing tabs either have no affect on the thrust produced, or increase the momentum (thrust) of the exhaust flow exiting from the exhaust nozzle. In the second position, that is, the "deployed" position, the exhaust mixing tabs are deformed to extend into the flow path. In this position the exhaust mixing tabs promote mixing of the exhaust flow with an adjacent air flow. This results in the attenuation of noise generated by the jet engine.

30 Claims, 5 Drawing Sheets

U.S. PATENT DOCUMENTS

| | | |
|---|---|---|
| 6,655,218 B1 | 12/2003 | Ogisu et al. |
| 6,718,752 B2 | 4/2004 | Nesbitt et al. |
| 7,216,831 B2 * | 5/2007 | Wood .................. 244/99.8 |
| 2001/0010348 A1 * | 8/2001 | Bilanin et al. ............. 244/215 |
| 2002/0125340 A1 | 9/2002 | Birch et al. |
| 2006/0101807 A1 * | 5/2006 | Wood et al. ............... 60/262 |

FOREIGN PATENT DOCUMENTS

| | | |
|---|---|---|
| GB | 750307 | 6/1956 |
| JP | 07-237599 | 9/1995 |

OTHER PUBLICATIONS

Rey N. M. et al, "Shape Memory Alloy Actuation for a Variable Area Fan Nozzle" Proceedings of the SPIE, SPIE, Bellingham, VA, US, vol. 4332, Mar. 5, 2001, pp. 371-382.

"Subsonic Jet Noise Reduction Variable Geometry Chevron," F. T. Calkins and G. W. Butler, Jan. 3-8, 2004, pp. 1-12.

"Morphing Chevrons for Take Off and Cruise Noise Reduction," James H. Mabe, Robert T. Ruggert, G. W. Butler, Scott Sellmeyer, Sep. 20-22, 2004, pp. 1-12.

* cited by examiner

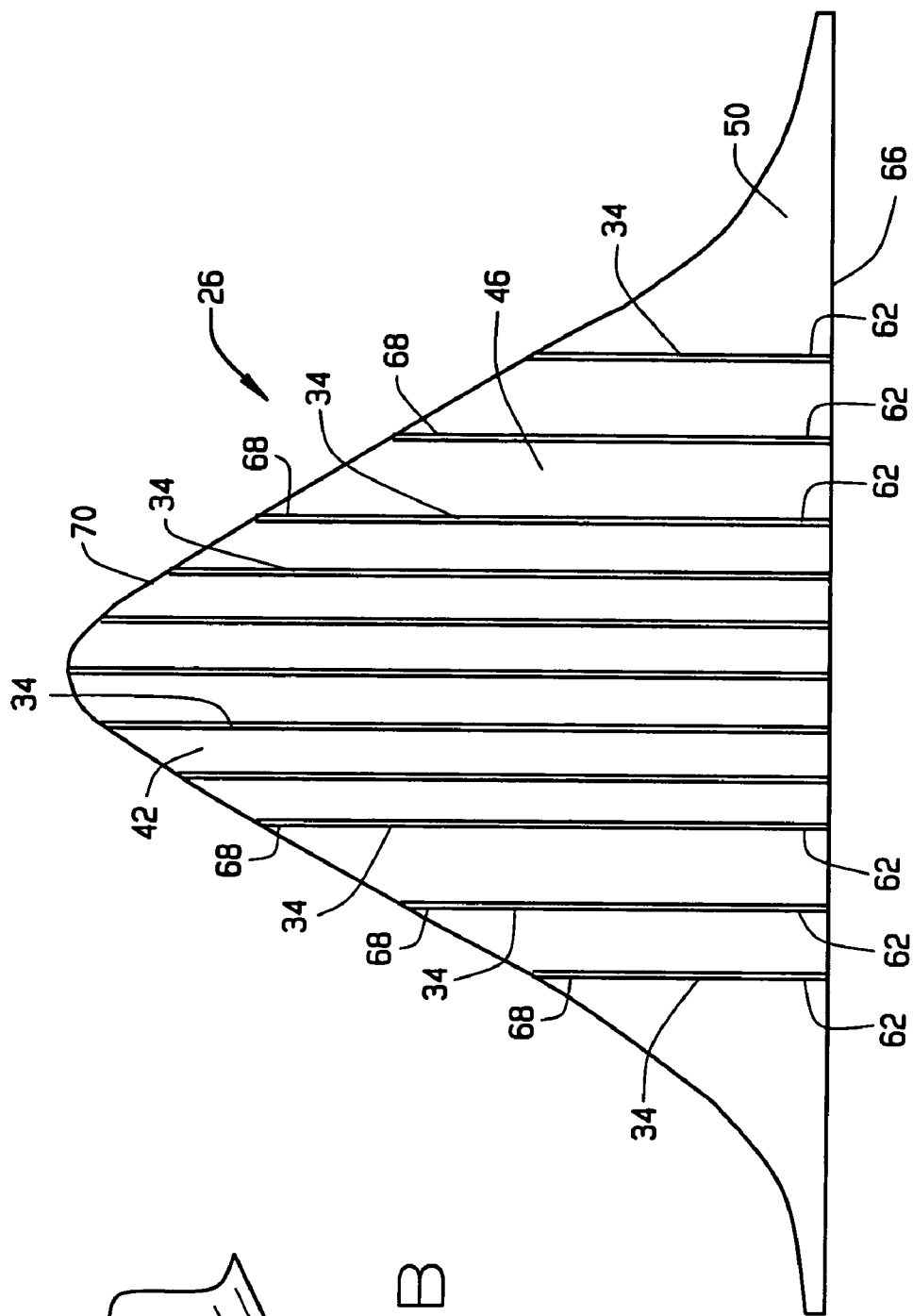

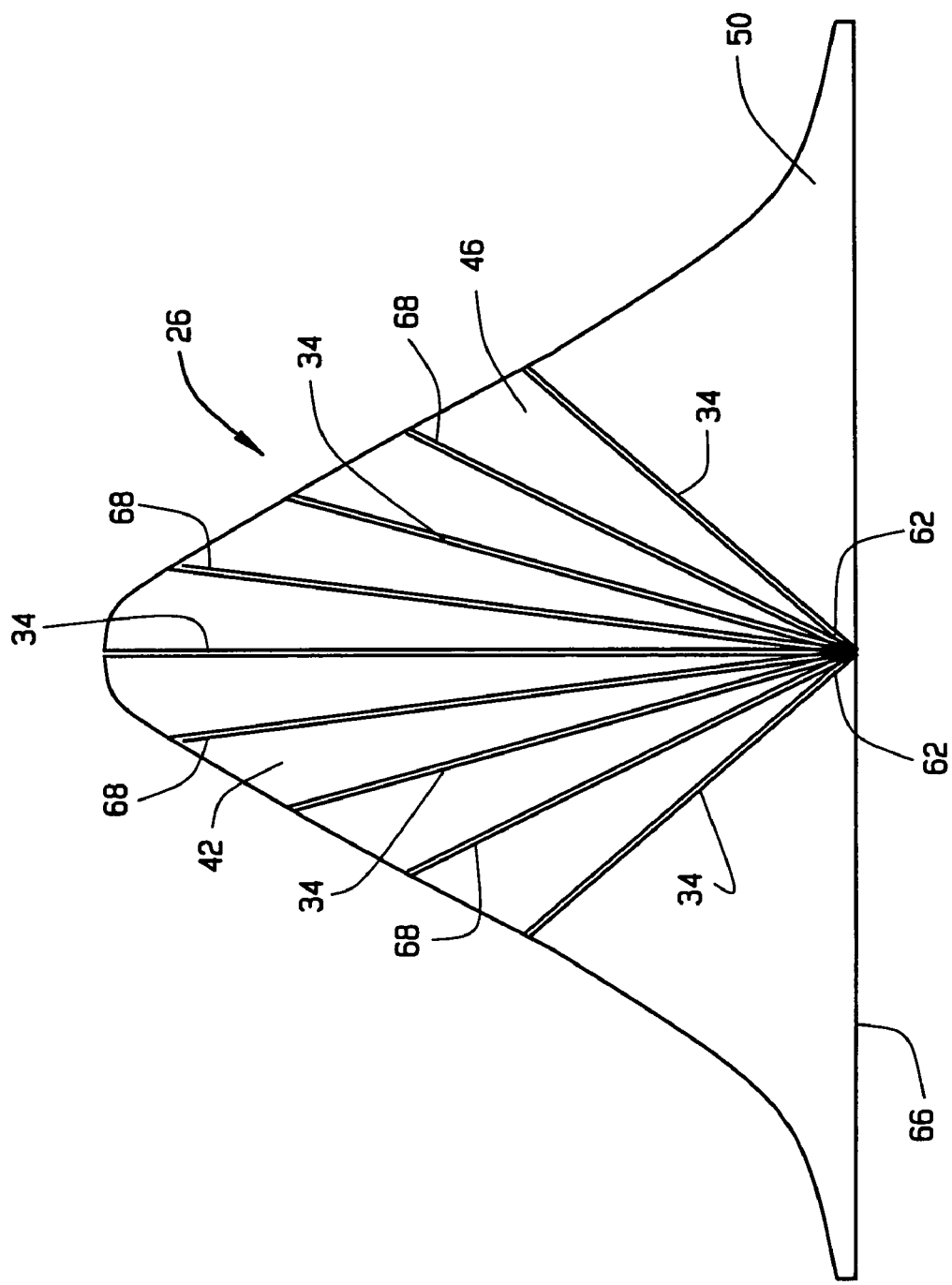

REDUCED NOISE JET ENGINE

FIELD OF INVENTION

This invention relates to the reduction of noise produced by jet engines, and more particularly to an engine nacelle exhaust nozzle having an Irregular edge that forms a plurality of exhaust mixing tabs adapted to improve mixing of exhausts to attenuate noise produced by the engine.

BACKGROUND OF THE INVENTION

With present day jet aircraft, structures typically known in the industry as "chevrons" have been researched to attenuate noise generated by a jet engine. The chevrons have traditionally been fixed (i.e., immovable), triangular, tab-like elements disposed along a trailing edge of a primary and/or a secondary exhaust nozzle of the jet engine nacelle such that they project into the exhaust gas flow stream exiting from the exhaust nozzle. The chevrons have proven to be effective in reducing the broadband noise generated by the mixing of primary-secondary and secondary/ambient exhaust streams for high thrust operating conditions. Since the chevrons interact directly with the exhaust flow, however, they also generate drag and loss of thrust. Consequently, there is a tradeoff between the need to attenuate noise while still minimizing the loss of thrust due to the presence of the chevrons, Noise reduction is typically needed for takeoff of an aircraft but not during cruise. Thus, any noise reduction system/device that reduces noise at takeoff (i.e., a high thrust condition) ideally should not significantly degrade the fuel burn during cruise. A compromise therefore exists between the design of static (i.e. immovable) chevrons for noise abatement and the need for fuel efficient operation during cruise.

Thus, there exists a need for a noise reduction system which provides the needed noise attenuation at takeoff but does not produce drag and a loss of thrust during cruise conditions. More specifically, there is a need for a noise reduction system which permits a plurality of chevrons to be used in connection with an exhaust nozzle of a jet engine to attenuate noise during takeoff, but which also permits the chevrons to be moved out of the exhaust gas flow path of the engine during cruise conditions to prevent drag and a consequent loss of thrust during cruise conditions.

BRIEF SUMMARY OF THE INVENTION

The above limitations are overcome by a noise reduction system in accordance with preferred embodiments of the present invention. In one preferred form the noise reduction system comprises a plurality of exhaust mixing tabs spaced apart from one another and extending from a lip of an exhaust nozzle of a jet engine nacelle adjacent a flow path of an exhaust flow emitted from the exhaust nozzle. Each of the exhaust mixing tabs are constructed to be controllably deformable from a first position adjacent the flow path to a second position extending into the flow path of the exhaust flow in response to a stimulus applied to each of the exhaust mixing tabs. In the first position, the exhaust mixing tabs either have no affect on the thrust produced, or increase the momentum (thrust) of the exhaust flow exiting from the exhaust nozzle. In the second position, that is, the "deployed" position, the exhaust mixing tabs are deformed to extend into the flow path. In this position the exhaust mixing tabs promote mixing of the exhaust flow with an adjacent air flow. This results in the attenuation of noise generated by the jet engine.

In one preferred embodiment each exhaust mixing tab has a plurality of sleeves attached to an inner surface of the respective exhaust mixing tab. A shape memory alloy (SMA) tendon is disposed within each of the sleeves. Each SMA tendon is attached at a first end to a forward edge of the respective exhaust mixing tab and attached at a second end along an aft portion of the respective exhaust mixing tab, offset from an aft edge of the respective exhaust missing tab. The SMA tendons are adapted to constrict when activated by heat. The constriction applies a linear pulling force on the aft portion to cause the exhaust mixing tabs to be deployed into an exhaust flow emitted from the nozzle. This causes intermixing of the exhaust flow with adjacent air flow, thereby attenuating noise generated as the exhaust flow exits the nozzle. An outer layer of each exhaust mixing tabs acts a biasing component to return the exhaust mixing tabs to a non-deployed position when the SMA tendons are deactivated.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention. Furthermore, the features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein;

FIG. 3A is an illustration of a inner side of an exhausting mixing tab shown in FIGS. 1 and 2, having a plurality of shape memory alloy tendons attached, in accordance with a preferred embodiment of the present invention;

FIG. 3B is a cross-sectional view of a shape memory alloy tendon encased in a sleeve shown in FIG. 2;

FIG. 3C is an illustration of the inner side of an exhausting mixing tab shown in FIGS. 1 and 2, having the shape memory allow tendons attached, in accordance with another preferred embodiment of the present invention.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
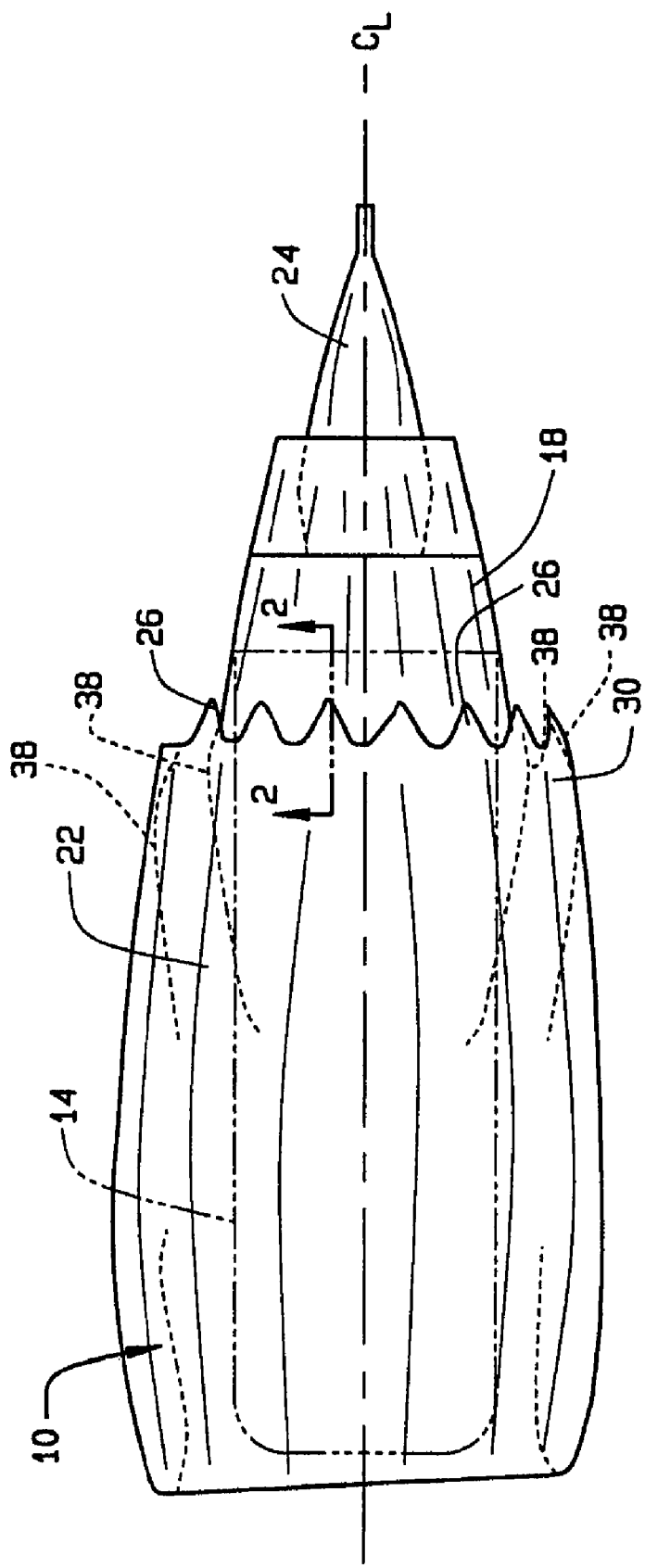
FIG. 1 is a simplified side view of a nacelle for housing a jet engine of an aircraft, with the nacelle incorporating a plurality of exhaust mixing tabs of the present invention along a trailing circumferential lip portion of the secondary exhaust nozzle of the nacelle.

Referring to FIG. 1, there is shown an engine nacelle 10 for housing a jet engine 14. The nacelle 10 includes a primary exhaust gas flow nozzle 18, also referred to in the art as a core exhaust nozzle that channels the exhaust flow of from a turbine (not shown) of the engine 14 out the aft end of the nacelle 10. The nacelle 10 additionally includes a secondary exhaust gas flow nozzle 22, also referred to in the art as a bypass fan exhaust nozzle, that directs the exhaust flow from an engine bypass fan (not shown) out of the aft end of the nacelle 10. A plug 24 is disposed within the nacelle 10. In a preferred embodiment, the secondary exhaust flow nozzle 22 includes a plurality of exhaust mixing tabs 26. The exhaust mixing tabs 26 extend from a lip area 30 of the secondary flow nozzle 22. As will be described in greater detail in the following paragraphs, in operation each of the exhaust mixing tabs 26 is deformed (i.e., bent or deflected) in response to a stimulus that causes shape memory allow (SMA) tendons 34 (shown in FIGS. 2, 3 and 4) attached to the exhaust mixing tabs 26 to be heated. When heated the SMA tendon 34 constrict in a one-dimensional linear direction, thereby causing the exhaust mixing tabs 26 to extend (i.e., "be deployed") partially into the exhaust gas flow path exiting from the secondary exhaust gas flow nozzle 22. This is indicated by dashed lines 38 near the uppermost and lowermost exhaust mixing tabs 26 in the drawing of FIG. 1. The exhaust mixing tabs 26 are preferably arranged circumferentially around the entire lip portion 30 of the secondary exhaust gas flow nozzle 22.

Figure 2:
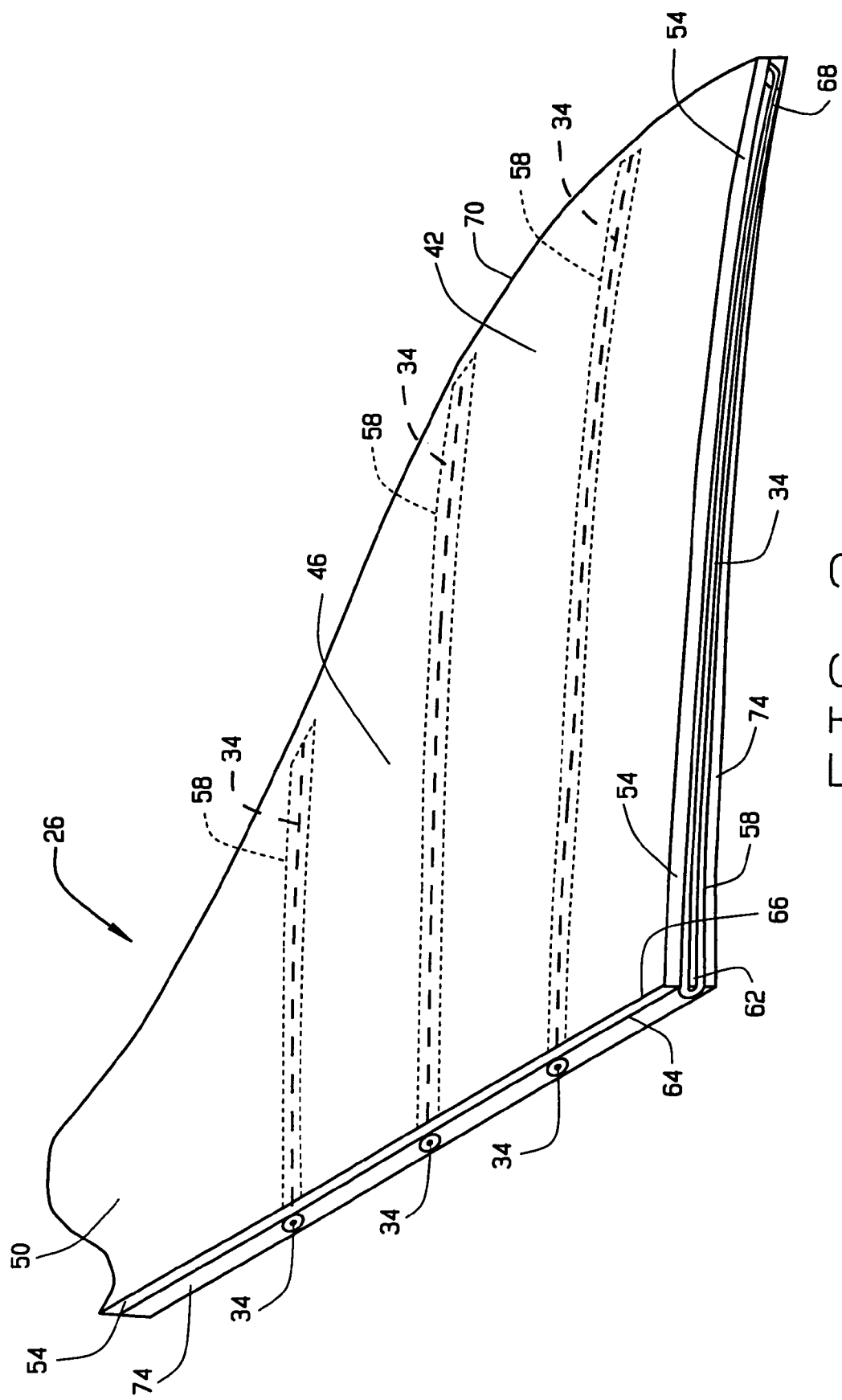
FIG. 2 is a partial side view of one of the exhaust mixing tabs taken in accordance with section line 2—2 in FIG. 1.

Referring to FIG. 2, a portion of one of the exhaust mixing tabs 26 is illustrated. It will be appreciated that in the industry the exhaust mixing tabs 26 are often referred to as "chevrons". However, it should be appreciated that while the term "chevron" implies a triangular shape, the exhaust mixing tabs 26 are not limited to a triangular configuration, but may comprise other shapes such as, but not limited to, rectangles, trapezoids or portions of circles. The exhaust mixing tabs 26 each include a distal portion 42, a root portion 46 and a nozzle extension portion 50. The distal portion 42 is the principal portion that projects into the exhaust gas flow path discharged from the secondary exhaust gas flow nozzle 22. The root portion 46 forms an intermediate area for transitioning from the distal portion 42 to the nozzle extension portion 50. In a preferred embodiment, the nozzle extension portions 50 of the exhaust mixing tabs 26 are integrally formed with the lip portion 30 of the nacelle 10. Alternatively, the nozzle extension portion 50 is secured the exhaust mixing tab 16 to the lip portion 30 of the secondary exhaust flow nozzle 22 using any suitable fastening means. For example, the nozzle extension portions 50 of the exhaust mixing tabs 26 can be secured to the lip 30 of the nacelle 10 with rivets, by welding, or any other suitable securing means.

Referring now to FIGS. 2, 3A, 3B and 3C the exhaust mixing tab 16 includes an outer layer 54 (best shown in FIG. 2) constructed of any material suitable for the construction of jet engine nacelles. In a preferred embodiment, the outer layer 54 is integrally formed with the nacelle lip 30. As best shown in FIG. 3B, each SMA tendon 34 is enclosed in a sleeve 58 having an inner diameter that is slightly larger than an outer diameter of the SMA tendons 34 such that an air gap 60 exists between the SMA tendon and the sleeve 58. The air gaps 60 allow the diameter of SMA tendons 34 to expand when the lengths of SMA tendons 34 shorten during activation without interference, as described further below. For clarity and convenience, only the SMA tendons 34 are shown in FIGS. 3A and 3C, the sleeves 58 are not shown. Thus, although the sleeves 58 are not shown, it should be understood that each SMA tendon 34 shown in FIGS. 3A and 3C are enclosed within a related sleeve 58. The sleeves 58 are attached to and conform with the contour of the an inner side 64 of the exhaust mixing tabs 26. The sleeves 58 retain the SMA tendons 34 in effectively the same contour when the SMA tendons 34 are activated to generate a pulling force that bends the respective exhaust mixing tabs 26 into the exhaust flow.

A first end 62 (best shown in FIGS. 3A and 3C) of each SMA tendon 34 is attached to the inner side 64 of the related exhausting mixing tab 26 at a forward edge 66 that is adjacent the nacelle lip 30. An opposing second end 68 of each SMA tendon 34 is attached to the inner side 64 of exhaust mixing tab 26 along an aft edge 70, i.e. the trailing edge. In a preferred form, the second ends 68 are offset from the aft edge 70 to generate a greater end moment and resultant inward deflection, when the SMA tendons 34 are activated. That is, the second ends 68 are attached to the inner side 70 a short distance from the aft edge 70, as shown in FIG. 2. The first and second ends 62 and 68 of the SMA tendons 34 are attached to the exhaust mixing tabs 26 using any suitable means, such as termination by swaged ferrule or clamping into an end block.

Each sleeve is affixed, bonded or otherwise suitably secured to the inner side 64 of the related exhaust mixing tab 26 using any suitable means, such as adhesive bonding or embedding in a compliant filler material. In a preferred embodiment, the length of each sleeve 58 is shorter than the length of the SMA tendon 34 enclosed therein. Therefore, at least one end of each SMA tendon 34 extends past the end of the respective sleeve 58. This allows the SMA tendon 34 to constrict, i.e. shorten in length, when activated. The SMA tendons 34 are activate by heating the SMA tendons 34. For example, the SMA tendons 34 can be heated by the ambient air temperature exhaust gas flow emitted from the secondary exhaust gas flow nozzle 22 or by a separately controlled heat source.

When the SMA tendons 34 constrict, i.e. in an austenitic state) force is applied to the inner sides 64 of the respective exhaust mixing tabs 26. This force causes the exhaust mixing tabs 26 to deploy, i.e. curve or curl inward, into the bypass fan exhaust flow, thereby causing an improved mixing of the exhaust with the ambient air. Therefore, noise generated by the engine 14 is attenuated. In one preferred form the SMA tendons 34 comprise wires constructed of a nickel-titanium alloy. More preferably, nickel-titanium shape-memory alloy is used for the SMA tendons 34. The geometry or pattern in which the SMA tendons are attached to the inner sides 64 of the exhaust mixing tabs 26 is dependent on the desired shape of the exhaust mixing tabs 26 when deployed. That is, it may be desirable to deploy the exhaust mixing tabs 26 such that each exhaust mixing tab 26 curls inward in a linear roll fashion, whereby the exhaust mixing tabs 24 have a non-cupped curvature. Or, it may be desirable to deploy the exhaust mixing tabs 26 such that each exhaust mixing tab 26 curves inward to take on a concave or cupped form.

For example, as shown in FIG. 3A, the SMA tendons can be disposed on the inner side 64 of each exhaust mixing tab 26 in essentially a 'parallel line' pattern. Alternatively, as shown in FIG. 3C, the SMA tendons can be disposed on the inner side 64 of each exhaust mixing tab 26 in a 'fan-like' pattern. Thus, the SMA tendons can be disposed on and attached to the inner sides 64 of the exhaust mixing tabs 26 in any desirable geometry or pattern or any mixture of patterns based on the form the exhaust mixing tabs are desired to take on when the SMA tendons 26 are activated. Furthermore, the SMA tendons 34 may be attached to various exhaust mixing tabs 26 in a first pattern while other exhaust mixing tabs 26 have the SMA tendons 34 disposed on their inner sides 64 in a second pattern, based on the desired mixing of exhaust with the ambient air. Further yet, the number of SMA tendons 34 attached to each exhaust mixing tab 26 is determined based on the amount of deflection or deformation desired. That is, if a more severe deformation is desired, such that the exhaust mixing tabs 26 are deployed further into the exhaust flow, a greater number of SMA tendons 34 will be attached to each exhaust mixing tab 26. Even further, the number of SMA tendons 34 attached to each exhaust mixing tab 26 can be different for various exhaust mixing tabs 26 included as part of a single nacelle 10.

In a preferred implementation, a compliant coating 74, shown in FIG. 2, is disposed across the inner side 64 and over the sleeves 58 of each SMA tendon 34. The compliant coating 74 can be any material suitable for coating the inner sides of each exhaust mixing tab 26 and other nacelle components such that an aerodynamically smooth surface is created. For example, the compliant coating 74 could comprise an elastomer that is sufficiently flexible to allow the exhaust mixing tabs 26 to be deployed without adding any significant resistance. Additionally, the compliant coating 74 can comprise thermal insulation properties to protect the sleeves 58 and the SMA tendons 34 from being damaged by the bypass fan exhaust or other exhausts produced by the engine 14.

The SMA tendons 34 have a predetermined length when secured to the inner sides 64 of the exhaust mixing tabs 26. When the environment surrounding the SMA tendons 34 is below a transition temperature of the SMA tendons 34, i.e. an actuation temperature, for example −20 to +20° F., the rigidity of the composite layer 54 is greater than that of forces applied to the exhaust mixing tabs 26 by SMA tendons 34. Therefore, the rigidity of the composite layer 54 causing the SMA tendons 34 to be held taut across the inner sides 64. This may also be referred to as the "martensitic" state of the SMA tendons 34 (i.e., the "cold" state).

When the environment surrounding the SMA tendons 34 is greater than the transition temperature, for example when the SMA tendons 34 are exposed to the bypass fan exhaust, the SMA tendons 34 are activated and constrict significantly (i.e., also known as its "austenitic" state). That is, the SMA tendons 34 shorten in length, which in turn causes the exhaust mixing tabs 26 to deploy, i.e. bend or deform into the exhaust gas flow 38. In their activated condition, the forces applied by the SMA tendons 34 overcome the rigidity of the composite layer 54, thus causing the exhaust mixing tabs 26 to deploy. Once the temperature of the surrounding environment cools and begins drops below the transition temperature, the rigidity of the composite layer 54 gradually overcomes the forces from the constricting, i.e. activated, SMA tendons 34. This effectively "pulls" the SMA tendons 34 back to their original length and returns the exhaust mixing tabs 26 to their non-deployed position. Thus, the composite layer 54 acts as a 'return spring' to return the exhaust mixing tabs 26 to their non-deployed positions. It should be understood that the non-deployed position is when the exhaust mixing tabs 26 are positioned adjacent the exhaust flow path and not being deformed by the constriction of the SMA tendons 34 to extend into the exhaust flow path.

In an alternate preferred embodiment the composite layer 54 comprises a shape-memory allow such as nickel-titanium shape-memory alloy. An advantage of utilizing a super-elastic alloy is that it is extremely corrosion resistant and ideally suited for the harsh environment experienced adjacent the exhaust gas flow 38. Also of significant importance is that it can accommodate the large amounts of strain required of the deformed shape.

In a preferred embodiment, the SMA tendons are heated using the exhaust gases from the secondary exhaust gas flow nozzle 22. In actual operation, the heat provided by the exhaust gases emitted from the secondary exhaust gas flow nozzle 22 is typically sufficient in temperature (approximately 130 degrees Fahrenheit) to produce the needed constriction of the SMA tendons 34. The actual degree of deformation may vary considerably depending upon the specific type of shape memory alloy used, as well as gauge or diameter of the SMA wire used to construct the SMA tendons 34. When the aircraft reaches its cruising altitude, the significant drop in ambient temperature effectively acts to cool the SMA tendons 34. The cooling of the SMA tendons 34 allows the composite layer 54 to stretch the SMA tendons 34 back to their non-activated length and exhaust mixing tabs 26 to return to their non-deployed positions.

In an alternative preferred embodiment, the SMA tendons 34 are heated by connecting the SMA tendons 34 to a controllable current source (not shown). To heat the SMA tendons 34 the current source is turned on such that current flows through the SMA tendons 34. This causes the SMA tendons 34 to generate heat that in turn causes the the SMA tendons 34 to constrict significantly. As described above, this constriction of the SMA tendons 34 the exhaust mixing tabs 26 to deploy into the exhaust gas flow 38. When it is desired that the exhaust mixing tabs 26 no longer be deployed, e.g. when the aircraft reaches cruising altitude, the current source is turned off. This allows the SMA tendons 34 cool so that the rigidity of the composite layer 54 gradually overcomes the constricting forces of the SMA tendons 34, thereby returning the exhaust mixing tabs 26 to their non-deployed positions.

When each of the exhaust mixing tabs 26 is deployed, and thus protruding into the exhaust gas flow path 38, the exhaust gas is intermixed with the ambient air flowing adjacent the secondary exhaust gas flow nozzle 22. This intermixing produces a tangible degree of noise reduction. Most advantageously, as the aircraft reaches its cruise altitude, the retraction of the exhaust mixing tabs 26 to the non-deployed position, for example the exhaust mixing tabs 34 have essentially shape shown in FIG. 2, prevents the drag and loss of thrust that would otherwise be present if the exhaust mixing tabs 26 each remained deployed.

Figure 4:
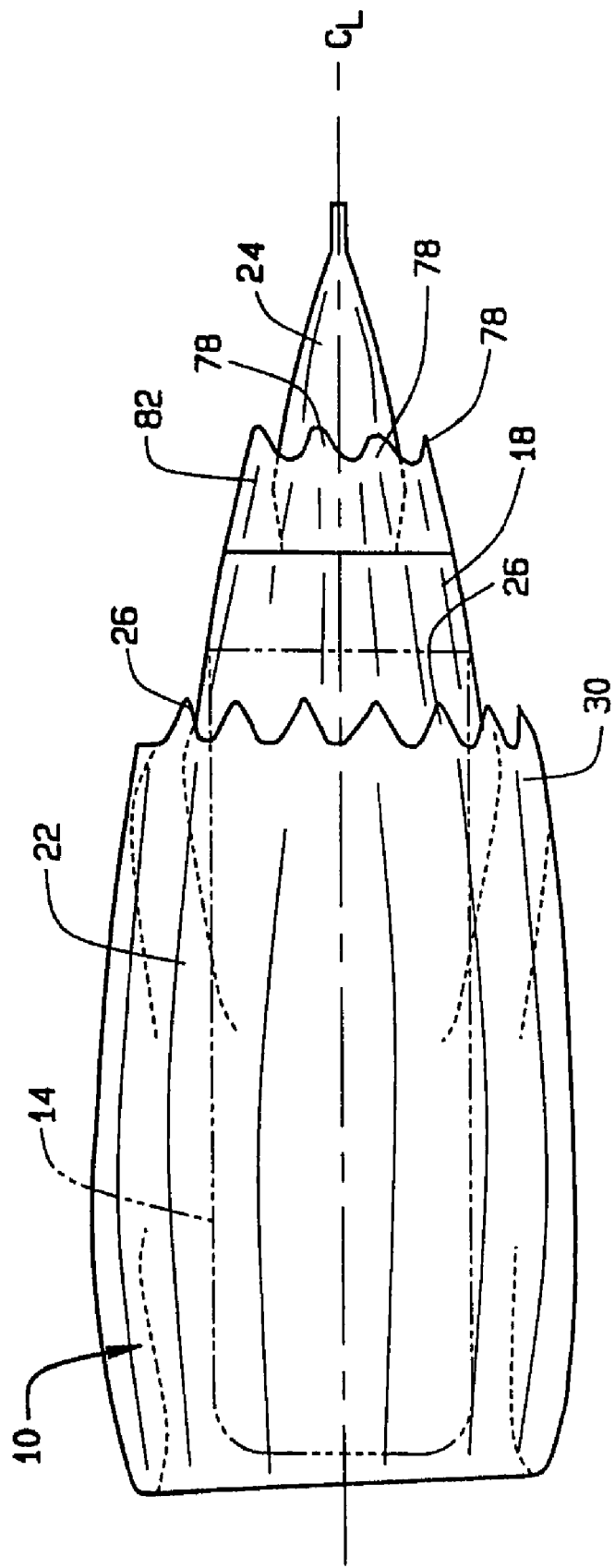
FIG. 4 is a simplified side view of the nacelle shown in FIG. 1 in accordance with another preferred embodiment of the present invention.

Referring to FIG. 4, in another preferred embodiment the primary exhaust nozzle 18 includes a plurality of exhaust mixing tabs 78 that extend from a lip area 82 of the primary flow nozzle 18. SMA tendons are attached to the exhaust mixing tabs 78 in the same manner as described above with reference to SMA tendons 34 and exhaust mixing tabs 26. The exhaust mixing tabs 78 and associated SMA tendons are essentially the same in form and function as the exhaust mixing tabs 26, described above with reference to FIGS. 1-3C, with the exception that the exhaust mixing tabs 78 deploy to increase the mixing of core exhausts, i.e. turbine exhaust, with the ambient air. Thus, although the above description of the present invention with respect to exhaust mixing tabs 26 will not be repeated with reference to exhaust mixing tabs 78, it should be understood that exhaust mixing tabs 78 are deployed utilizing SMA tendons in essentially the identical manner as described above with reference to exhaust mixing tabs 26. Furthermore, it should be understood that FIGS. 2, 3A, 3B, and 3C and the related description set forth above can be used to describe the present invention with reference to both exhaust mixing tabs 26 and 78, with the understanding that the exhaust mixing tabs 78 are associated with the primary flow nozzle 18 while the exhaust mixing tabs 26 are associated with the secondary flow nozzle 22. Furthermore, it should be understood when the embodiment described above, whereby the SMA tendons 34 are heated via the by-pass fan exhaust, is applied to the SMA tendons associated with the exhaust mixing tabs 78, the core exhaust would be utilized to activate the exhaust mixing tabs 78 SMA tendons.

The preferred embodiments described herein thus provide deployable exhaust mixing tabs connected to the bypass fan exhaust nozzle, and/or the core exhaust nozzle. The exhaust mixing tabs are deployed, i.e. temporarily bent, into the exhaust flow(s) using shape memory tendons that constrict when activated to apply a one-dimensional linear force at an aft edge area of each exhaust mixing tabs. The constriction pulls on the aft edge area to bend each exhaust mixing tab into the respective exhaust flow(s), which provides a desired degree of noise attenuation provided upon takeoff of an aircraft. Additionally, the preferred embodiments allow unobstructed or accelerating exhaust gas flow from the secondary and/or primary exhaust gas nozzle(s) when the aircraft is operating at a cruise altitude. Due to the use of SMA actuators, the preferred embodiments of the invention do not add significant weight to the engine nacelle nor do they unnecessarily complicate the construction of the nacelle.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A system for controlling a position of jet engine exhaust mixing tabs, said system comprising:
   a plurality of exhaust mixing tabs extending from a lip of at least one nozzle of an engine nacelle;
   a plurality of shape memory alloy (SMA) tendons attached at opposing ends to each exhaust mixing tab, wherein the SMA tendons are adapted to constrict when activated by heat, the constriction causing the exhaust mixing tabs to deploy into an exhaust flow emitted from the nacelle nozzle, the deployment causing the exhaust flow to intermix with adjacent air flow; and
   a plurality of tubular SMA tendon sleeves attached to and contouring with an inner surface of each exhaust mixing tab, each sleeve enclosing one of the SMA tendons in a 'slip-fit' fashion such that an air gap exists between each sleeve and the respective SMA tendons, each sleeve adapted to retain the respective SMA tendons when the SMA tendons are activated to deploy the respective exhaust mixing tabs.

2. The system of claim 1, wherein each exhaust mixing tab comprises an outer layer adapted to return the exhaust mixing tabs to a non-deployed position when the SMA tendons are deactivated.

3. The system of claim 1, wherein each exhaust mixing tab comprises a compliant coating disposed across an inner surface of each exhaust mixing tab.

4. The system of claim 1, wherein the engine nacelle nozzle comprises a by-pass fan exhaust nozzle.

5. The system of claim 1, wherein the engine nacelle nozzle comprises an engine turbine exhaust nozzle.

6. The system of claim 1, wherein the engine nacelle nozzle comprises a by-pass fan exhaust nozzle and an engine turbine exhaust nozzle.

7. The system of claim 1, wherein the SMA tendons are activated by heat generated by the exhaust flow emitted from the nacelle nozzle.

8. The system of claim 1, wherein the SMA tendons are deactivated by being exposed to air having a temperature substantially cooler than the exhaust flow emitted from the nacelle nozzle.

9. The system of claim 1, wherein the SMA tendons are activated by heat generated by connecting the SMA tendons to an electrical current source.

10. The system of claim 9, wherein the SMA tendons are deactivated by disconnecting the SMA tendons from the electrical current source.

11. The system of claim 1, wherein the SMA tendons are attached to an inner surface of at least one exhaust mixing tab in a 'parallel line' pattern.

12. The system of claim 1, wherein the SMA tendons are attached to an inner surface of at least one exhaust mixing tab in a 'fan-like' pattern.

13. A method for varying a position of jet engine exhaust mixing tabs, said method comprising:
    activating a plurality of shape memory alloy (SMA) tendons enclosed in a plurality of tubular SMA tendon sleeves in a 'slip-fit' fashion, and attached to a plurality of exhaust mixing tabs extending from a lip of at least one nozzle of an engine nacelle, each tendon sleeve attached to and contouring with an inner surface of each exhaust mixing tab, and each SMA tendon attached at a first end to an inner side forward edge of the respective exhaust mixing tab and attached at a second end along an inner side aft portion of the respective exhaust mixing tab offset from an aft edge of the respective exhaust missing tab;
    wherein the SMA tendons constrict when activated and pull on the aft portion to cause the exhaust mixing tabs to deploy into an exhaust flow emitted from the nacelle nozzle, thereby intermixing the exhaust flow with adjacent air flow.

14. The method of claim 13, wherein the method further comprises returning each exhaust mixing tab to a non-deployed position utilizing outer layer of the respective exhaust mixing tabs to generate a biasing force that returns the exhaust mixing tabs to the non-deployed position when the SMA tendons are deactivated.

15. The method of claim 13, wherein activating the SMA tendons comprises activating the SMA tendons attached to the exhaust mixing tab extending from the lip of at least one of a by-pass fan exhaust nozzle and a turbine exhaust nozzle.

16. The method of claim 13, wherein activating the SMA tendons comprises utilizing heat generated by the exhaust flow emitted from the nacelle nozzle to activate the SMA tendons.

17. The method of claim 16, wherein the method further comprises deactivating the SMA tendons by exposing the SMA tendons to air having a temperature substantially cooler than the exhaust flow emitted from the nacelle nozzle.

18. The method of claim 13, wherein activating the SMA tendons comprises connecting the SMA tendons to an electrical current source to generate heat to activate the SMA tendons.

19. The method of claim 18, wherein the method further comprises deactivating the SMA tendons by disconnecting the SMA tendons from the electrical current source.

20. The method of claim 13, wherein activating the SMA tendons comprises disposing the SMA tendons to the inner surface of the exhaust mixing tabs in a 'parallel line' pattern.

21. The method of claim 13, wherein activating the SMA tendons comprises disposing the SMA tendons to the inner surface of the exhaust mixing tabs in a 'fan-like' pattern.

22. A jet engine nacelle having variable position exhaust mixing tabs, said nacelle comprising:
- at least one exhaust nozzle comprising a plurality of exhaust mixing tabs extending from a lip of the nozzle;
- plurality of sleeves attached to and contouring with an inner surface of each exhaust mixing tab;
- a plurality of shape memory alloy (SMA) tendons, each SMA tendon disposed within a respective one of the sleeves, each SMA tendon attached at a first end to a forward edge of the respective exhaust mixing tab and attached at a second end along an aft portion of the respective exhaust mixing tab offset from an aft edge of the respective exhaust missing tab; and
- wherein the SMA tendons are adapted to constrict when activated by heat and pull on the aft portion to cause the exhaust mixing tabs to deploy into an exhaust flow emitted from the nozzle, thereby intermixing the exhaust flow with adjacent air flow.

23. The nacelle of claim 22, wherein each sleeve encloses one of the SMA tendons in a 'slip-fit' fashion such that an air gap exists between each sleeve and the respective SMA tendons, each sleeve adapted to retain the respective SMA tendons within the sleeves when the SMA tendons are activated to deploy the respective exhaust mixing tabs.

24. The system of claim 22, wherein each exhaust mixing tab comprises an outer layer adapted to return the exhaust mixing tabs to a non-deployed position when the SMA tendons are deactivated.

25. The system of claim 22, wherein the nacelle further comprise a compliant coating disposed across an inner surface of the exhaust nozzle and each exhaust mixing tab, the compliant coating covering the sleeves and providing an aerodynamically smooth inner surface.

26. The system of claim 22, wherein the exhaust nozzle comprises at least one of an engine by-pass fan exhaust nozzle and an engine turbine exhaust nozzle.

27. The system of claim 22, wherein the SMA tendons are adapted to:
- activate when exposed to heat generated by the exhaust flow emitted from the nozzle; and
- deactivate when exposed to air having a temperature substantially cooler than the exhaust flow emitted from the nozzle.

28. The system of claim 22, wherein the SMA tendons are adapted to:
- activate when heated by connecting the SMA tendons to an electrical current source; and
- deactivate when the SMA tendons are disconnected from the electrical current source.

29. The system of claim 22, wherein the SMA tendons are attached to an inner surface of at least one exhaust mixing tab in a 'parallel line' pattern.

30. The system of claim 22, wherein the SMA tendons are attached to an inner surface of at least one exhaust mixing tab in a 'fan-like' pattern.

* * * * *